J. J. McLOY.
AUTOMATIC EGG BEATER.
APPLICATION FILED DEC. 17, 1914.
1,148,032.
Patented July 27, 1915.
2 SHEETS—SHEET 1.
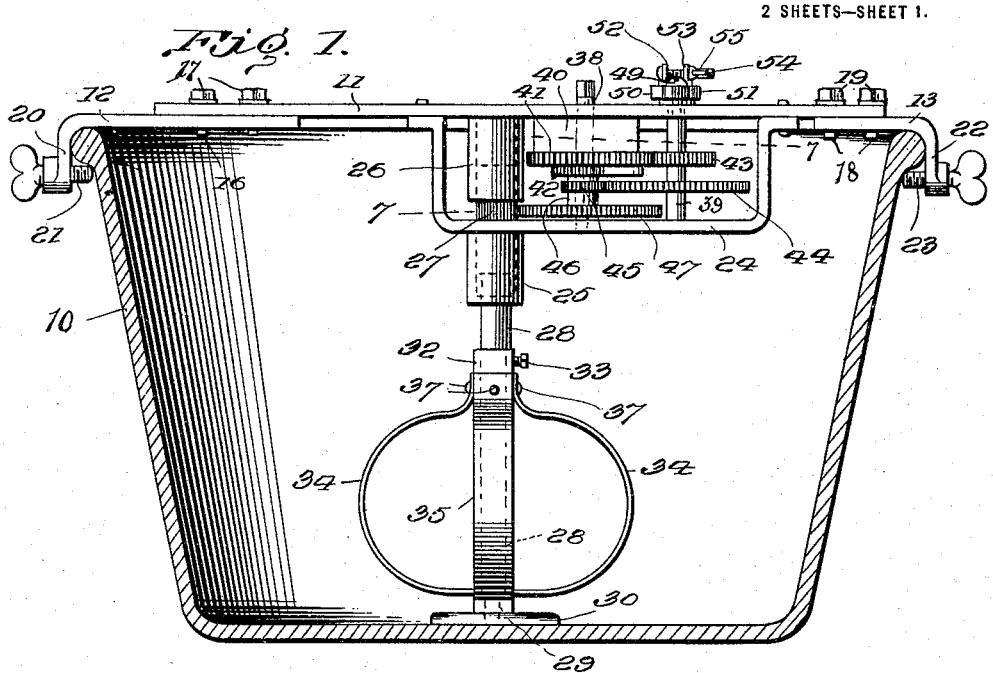
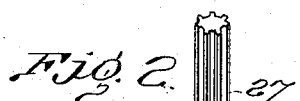
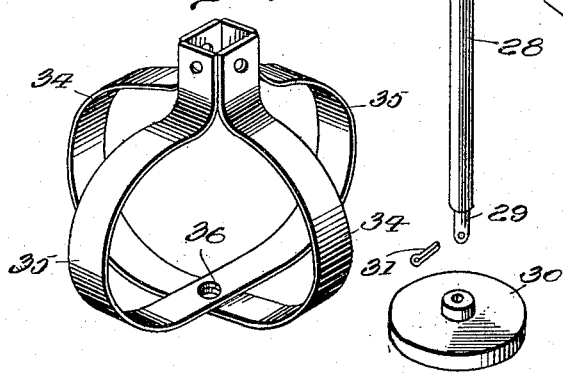
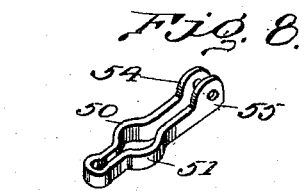
Inventor
Jesse J. McLoy
Witnesses

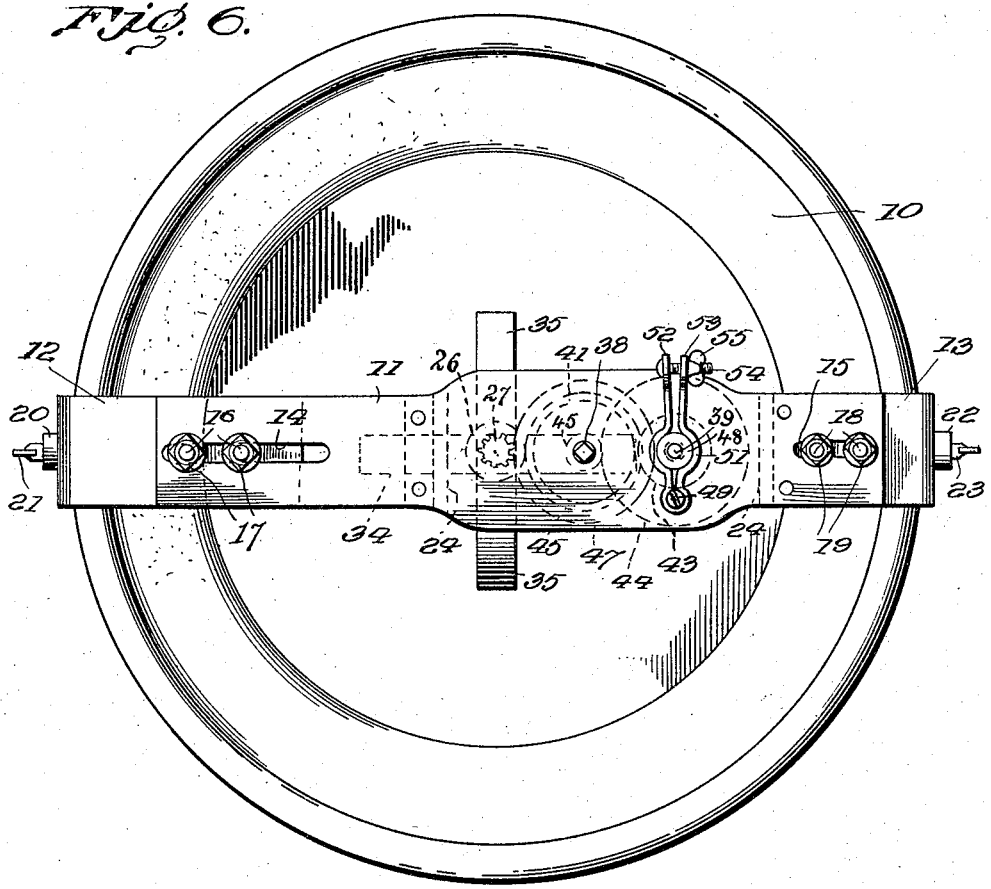
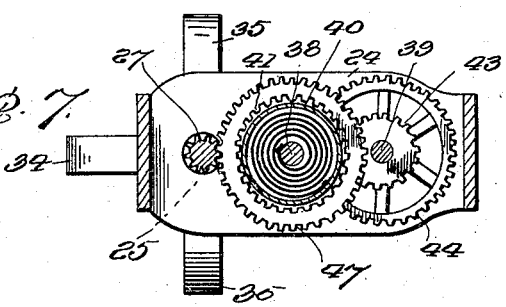

UNITED STATES PATENT OFFICE.

JESSE J. McLOY, OF CLIFTON, ARIZONA.

AUTOMATIC EGG-BEATER.

1,148,032.  Specification of Letters Patent.  Patented July 27, 1915.

Application filed December 17, 1914. Serial No. 877,752.

*To all whom it may concern:*

Be it known that I, JESSE J. McLOY, a citizen of the United States, residing at Clifton, in the county of Greenlee and State of Arizona, have invented certain new and useful Improvements in Automatic Egg-Beaters, of which the following is a specification.

This invention relates to devices for beating eggs, whipping cream, and for like purposes, and has for one of its objects to improve the construction and increase the efficiency and utility of devices of this character.

Another object of the invention is to provide a simply constructed device adapted to be actuated by a spring, and which may be adjusted to vessels of various sizes and forms.

With these and other objects in view, the invention consists in certain novel features of construction as hereafter shown and described, and then specifically pointed out in the claims; and in the drawings illustrative of the preferred embodiment of the invention, Figure 1 is a side elevation of the improved device applied to a conventional dish, the dish being in section; Fig. 2 is a detached perspective view of the main shaft; Fig. 3 is a detached perspective view of the step of the operating shaft; Fig. 4 is a detached perspective view of the coupling member between the shaft and the beater blades; Fig. 5 is a detached perspective view of the beater blades; Fig. 6 is a plan view; and Fig. 7 is a section on the line 7—7 of Fig. 1. Fig. 8 is a detached perspective view of the brake device.

The improved device may be attached to any suitable dish or receptacle for the eggs, cream or other product to be acted upon, the dish being represented conventionally at 10.

The improved device comprises a supporting frame formed with a central longitudinal member 11 and terminal members 12—13. The member 11 is provided with longitudinal slots 14—15 near the ends. The member 12 is provided with spaced clamping bolts 16 which extend through the slot 14 and are provided with clamp nuts 17. The member 13 is provided with clamp bolts 18 extending through the slot 15 and provided with clamp nuts 19. By this arrangement, the members 12—13 may be adjusted longitudinally of the member 11 within the range of the slots 14—15, to adapt the supporting frame to dishes of various sizes. The member 12 is formed at its outer end with a depending portion 20 carrying a clamp bolt 21, while the member 13 is formed with a depending portion 22 carrying a clamp bolt 23, to enable the frame to be clamped to the upper edge of the dish 10.

Attached to the lower face of the main frame member 11 is a hanger frame 24 having a depending sleeve 25. The frame member 11 is likewise formed with a depending sleeve 26, the lower end of the sleeve 26 being spaced from the upper face of the hanger frame 24, as shown in Fig. 1. A main driving shaft forms a part of the improved device and is represented in Fig. 2 and comprises an upper portion 27 in the form of an elongated gear pinion and a reduced body portion 28. At its lower end, the body portion 28 is still further reduced, as shown at 29, to engage in a socket plate or step 30. The member 30 is designed to bear loosely upon the bottom of the dish 10 and the shaft is mounted for rotation in the step. The shaft may be secured in any suitable manner for rotation in the step 30, as for instance, by a cotter pin, indicated at 31. By this means the step and the shaft may be separated, when required, while at the same time the shaft is freely rotatable in the step.

The toothed portion 27 of the shaft is slidably disposed through the sleeves 25—26 and, at the same time, freely rotative therein with a portion of the toothed part of the shaft constantly exposed in the space between the lower end of the sleeve 26 and the upper face of the hanger frame 24, as shown in Fig. 1. Disposed upon the portion 28 of the shaft is a head member 32 having a plurality of flat faces, and connected rigidly to the shaft by a set-screw 33, so that the member 32 partakes of the rotary motion of the shaft.

The beater blades are coupled at their upper ends to the member 32 and engage the lower end of the portion 28 of the shaft. The construction of the beater blades is represented more specifically in Fig. 5, and formed of two flat narrow ribbon-like metal members 34—35, crossing each other intermediate their ends and perforated, as represented at 36, to receive the reduced portion 29 of the shaft, and curved outwardly and thence upwardly and inwardly and secured, as represented at 37, to the head member 32.

Mounted for rotation through the frame member 11 and the hanger frame 24 are shafts 38—39 spaced apart, as shown. An operating spring is inclosed within a casing 40 connected to the frame member 11, the spring being connected at one end to the shaft and at the other end to the casing in the ordinary manner. A gear 41 and a winding ratchet 42 are associated with the shaft 38 and the gear 41 and likewise with the spring, to enable the spring to rotate the shaft 38 in the ordinary manner.

Connected to rotate with the shaft 39 is a pinion 43 engaging the gear 41, while a relatively large gear 44 is likewise connected to rotate with the shaft 39 and engages a pinion 45 fast upon a sleeve 46 mounted to rotate around the shaft 38, the shaft 38 thus forming a journal for the sleeve and its attachments. A relatively large gear 47 is likewise connected to rotate with the sleeve 46 and engages the toothed portion 27 of the driving shaft between the lower end of the sleeve 26 and the upper face of the hanger frame 24. By this simple arrangement, the spring within the casing 40 is utilized to impart motion to the main driving shaft, and the latter may be adjusted vertically within the range of the toothed portion 27 without being disconnected from the gearing. By this simple arrangement, the improved device is adapted to dishes of various depths without the necessity of adjusting the main driving shaft as the latter automatically adapts itself to the depth of the dish by simply sliding vertically within the sleeves 25—26, as the step 30 controls the position of the shaft relative to the dish.

The upper end of the shaft 39 is provided with an enlarged head 48 to receive a brake device, the latter being formed from a single strip of tempered steel bent upon itself to form spaced sides and inclosing a pin 49 at the bend and curved, as shown at 50—51, to engage around the enlargement 48 and thence extended, as shown at 52—53, and the extended portions connected by a clamp bolt 54 having a wing nut 55. By this means an effectual brake device is produced whereby the speed may be readily controlled or the motion stopped entirely by actuating the thumb nut.

The improved device is simple in construction, can be inexpensively manufactured and adapted to dishes of various sizes and forms and automatically adapts itself to the depth of the dish, and requires no attention from the operator so far as the depth of the dish is concerned.

Having thus described the invention, what is claimed as new is:—

1. In a device of the character described, a support, a hanger carried by said support, a guide sleeve depending from said hanger, a guide sleeve depending from said support in longitudinal alinement with the sleeve of the hanger and spaced at its lower end from the hanger, a shaft adapted to actuate beater devices and having an elongated gear pinion slidable and rotative in said sleeves with a portion of the pinion constantly exposed between the hanger and the sleeve of the support, and a motor driven device including a gear in constant engagement with the exposed portion of the shaft pinion.

2. In a device of the character described, a support, guide sleeves associated with said support and spaced apart at their confronting ends, a shaft adapted to actuate beater devices and including an elongated gear pinion rotative and slidable in said sleeves with a portion constantly exposed between the ends of the sleeves, and a motor driven device including a gear in constant engagement with the exposed portion of the shaft pinion.

3. In a device of the character described, a support, guide sleeves associated with said support and spaced apart at their confronting ends, a shaft including an elongated gear pinion rotative and slidable in said sleeves with a portion constantly exposed between the ends of the sleeves, a step in which said shaft is mounted for rotation, a head member carried by said shaft, means for rigidly coupling said head member to said shaft, beater devices comprising blades crossing each other intermediate their ends and engaging said shaft at their crossing points and thence bent outwardly and upwardly and connected to said head device, and a motor driven device including a gear in constant engagement with the exposed portion of the shaft pinion.

4. In a device of the character described, a support adapted to be attached to a receptacle, co-acting guide sleeves carried by said support and spaced apart at their confronting ends, a shaft carrying beater devices and including an elongated pinion, said pinion being slidable and rotative in said sleeves, and a step in which said shaft is rotative and adapted to bear upon the bottom of said receptacle, a portion of said pinion being constantly exposed between the confronting ends of said sleeves, and a motor including a gear in constant engagement with the exposed portion of the pinion.

In testimony whereof I affix my signature in presence of two witnesses.

JESSE J. McLOY. [l. s.]

Witnesses:
J. H. Fenwick,
J. J. Widener.